(12) United States Patent
Zhang et al.

(10) Patent No.: US 9,672,416 B2
(45) Date of Patent: Jun. 6, 2017

(54) FACIAL EXPRESSION TRACKING

(71) Applicant: Microsoft Corporation, Redmond, WA (US)

(72) Inventors: Cha Zhang, Sammamish, WA (US); Zhengyou Zhang, Bellevue, WA (US); Bernardino Romera Paredes, London (GB)

(73) Assignee: Microsoft Technology Licensing, LLC, Redmond, WA (US)

( * ) Notice: Subject to any disclaimer, the term of this patent is extended or adjusted under 35 U.S.C. 154(b) by 66 days.

(21) Appl. No.: 14/265,201

(22) Filed: Apr. 29, 2014

(65) Prior Publication Data

US 2015/0310263 A1    Oct. 29, 2015

(51) Int. Cl.
| | | |
|---|---|---|
| *G06K 9/00* | (2006.01) | |
| *H04N 7/18* | (2006.01) | |
| *H04N 5/225* | (2006.01) | |
| *G06F 3/01* | (2006.01) | |
| *G02B 27/00* | (2006.01) | |
| *A63F 13/213* | (2014.01) | |

(Continued)

(52) U.S. Cl.
CPC ........ *G06K 9/00315* (2013.01); *A63F 13/212* (2014.09); *A63F 13/213* (2014.09); *A63F 13/56* (2014.09); *G02B 27/0093* (2013.01); *G02B 27/0172* (2013.01); *G06F 3/011* (2013.01); *G06K 9/00604* (2013.01); *H04N 5/2252* (2013.01); *H04N 7/18* (2013.01); *A63F 13/327* (2014.09); *G02B 2027/0178* (2013.01)

(58) Field of Classification Search
CPC G06F 3/011; G06K 9/00315; G06K 9/00624; G06K 9/00302; H04N 5/2252; H04N 7/18; A63F 13/00; A63F 13/212; A63F 13/213; A63F 13/327; A63F 13/56; G02B 2027/0178; G02B 27/0093; G02B 27/0172

See application file for complete search history.

(56) References Cited

U.S. PATENT DOCUMENTS 6,211,903 B1    4/2001   Bullister
6,493,136 B2 *  12/2002  Chang ................... G02B 7/002
                                         351/158

(Continued)

FOREIGN PATENT DOCUMENTS

WO    2013152453 A1    10/2013
WO    2013152454 A1    10/2013

OTHER PUBLICATIONS

International Search Report and Written Opinion mailed Jul. 24, 2015 from PCT Patent Application No. PCT/US2015/027188, 11 pages.

(Continued)

*Primary Examiner* — Tom Y Lu
(74) *Attorney, Agent, or Firm* — Rainier Patents, P.S.

(57) ABSTRACT

The description relates to facial tracking. One example can include an orientation structure configured to position the wearable device relative to a user's face. The example can also include a camera secured by the orientation structure parallel to or at a low angle to the user's face to capture images across the user's face. The example can further include a processor configured to receive the images and to map the images to parameters associated with an avatar model.

21 Claims, 9 Drawing Sheets

(51) Int. Cl.
A63F 13/212 (2014.01)
A63F 13/56 (2014.01)
G02B 27/01 (2006.01)
A63F 13/327 (2014.01)

(56) References Cited

U.S. PATENT DOCUMENTS

| | | | |
|---|---|---|---|
| 7,606,392 B2 | 10/2009 | Gordon et al. | |
| 8,068,169 B2* | 11/2011 | Chang | H04N 5/2251 348/373 |
| 8,573,866 B2 | 11/2013 | Bond et al. | |
| 8,601,379 B2 | 12/2013 | Marks et al. | |
| 2002/0080094 A1 | 6/2002 | Biocca et al. | |
| 2005/0208457 A1* | 9/2005 | Fink | G09B 21/00 434/112 |
| 2012/0044365 A1 | 2/2012 | Shuster | |
| 2013/0016124 A1 | 1/2013 | Han et al. | |
| 2013/0114850 A1 | 5/2013 | Publicover | |
| 2013/0117377 A1 | 5/2013 | Miller | |
| 2013/0242262 A1 | 9/2013 | Lewis | |
| 2014/0152758 A1* | 6/2014 | Tong | H04M 1/72555 348/14.02 |
| 2014/0266646 A1* | 9/2014 | Urbach | G08B 6/00 340/407.1 |
| 2014/0361974 A1* | 12/2014 | Li | G06F 3/005 345/156 |

OTHER PUBLICATIONS

Response and Demand filed Nov. 2, 2015 from PCT Application No. PCT/US2015/027188, 16 pages.
Dodds, et al., "Talk to the Virtual Hands: Self-Animated Avatars Improve Communication in Head-Mounted Display Virtual Environments", Published on: Oct. 2011, Available at: http://www.ncbi.nlm.nih.gov/pmc/articles/PMC3192118/.
Jackson, Patrick, "Google Glass", Retrieved on: Jan. 27, 2014, Available at : http://www.google.com/glass/start/.
Allison, et al., "Combined Head and Eye Tracking System for Dynamic Testing of the Vestibular System", In IEEE Transactions on Biomedical Engineering, vol. 43, Issue 11, Nov. 1996, 10 pages.
Bulling, et al., "Toward Mobile Eye-Based Human-Computer Interaction", In IEEE Pervasive Computing, vol. 9 Issue 4, Oct. 2010, pp. 8-12.
Steptoe, et al., "Lie Tracking: Social Presence, Truth and Deception in Avatar-Mediated Telecommunication", In Proceedings of SIGCHI Conference on Human Factors in Computing Systems, Apr. 10, 2010, pp. 1039-1048.
Hoerl, et al., "Ridge Regression: Biased Estimation for Nonorthogonal Problems", In Proceedings of Technometrics, vol. 42, No. 1, Feb. 2000, pp. 79-86.
Argyriou, et al., "Multi-Task Feature Learning", In Proceedings of 21st Annual Conference on Neural Information Processing Systems, Dec. 3, 2007, 8 pages.
Lecun, et al., "Convolutional Networks for Images, Speech, and Time Series", In the Handbook of Brain Theory and Neural Network 3361, Retrieved on: Feb. 3, 2014, pp. 1-14.
Smith, Mat, "NTT DoCoMo hands-free videophone prototype replaces that off-center webcam stare with your digital doppelganger (video)", Published on: Oct. 2, 2012, Available at: http://www.engadget.com/2012/10/02/ntt-docomo-hands-free-videophone-prototype-ceatec-2012/.
Xiao, et al., "Real-Time Combined 2D+3D Active Appearance Models", In IEEE Computer Society Conference on Computer Vision and Pattern Recognition, Jun. 2004, 8 pages.
Blanz, et al., "A Morphable Model for the Synthesis of 3D Faces", In Proceedings of 26th Annual Conference on Computer Graphics and Interactive Techniques, Jul. 1, 1999, pp. 187-194.
Vogler, et al., "The Best of Both Worlds: Combining 3D Deformable Models with Active Shape Models", In IEEE 11th International Conference on Computer Vision, Oct. 14, 2007, 7 pages.
Zhang, et al., "Real Time Feature Based 3-D Deformable Face Tracking", In Proceedings of the 10th European Conference on Computer Vision: Part II, Oct. 12, 2008, 14 pages.
Cai, et al., "3D Deformable Face Tracking with a Commodity Depth Camera", In Proceedings of 11th European Conference on Computer Vision Conference on Computer Vision: Part III, Sep. 5, 2010, 14 pages.
Weise, et al., "Realtime Performance-Based Facial Animation", In Proceedings of ACM SIGGRAPH, vol. 30, Issue 4, Jul. 2011, 10 pages.
"Faceshift", Retrieved on: Feb. 3, 2014, Available at: http://www.faceshift.com/.
Canny, John, "A Computational Approach to Edge Detection", In IEEE Transactions on Pattern Analysis and Machine Intelligence, vol. PAMI-8, Issue 6, Nov. 1986, pp. 679-698.
Ojala, et al., "Multiresolution Gray-Scale and Rotation Invariant Texture Classification with Local Binary Patterns", In IEEE Transactions on Pattern Analysis and Machine Intelligence, vol. 24, No. 7, Jul. 2002, pp. 971-987.
Krizhevsky, et al., "ImageNet Classification with Deep Convolutional Neural Networks", In 26th Annual Conference on Neural Information Processing Systems, Dec. 3, 2012, 9 pages.
B.R. Paredes, C. Zhang and Z. Zhang, "Facial Expression Tracking from Head-Mounted, Partially Observing Cameras," ICME 2014, Paper ID: 468, Chengdu, China, Jul. 2014 (6 Pages).
Second Written Opinion mailed May 4, 2016 from PCT Patent Application No. PCT/US2015/027188, 6 pages.
Response and Demand filed Jul. 4, 2016 to the Second Written Opinion mailed May 4, 2016 from PCT Patent Application No. PCT/US2015/027188, 12 pages.
International Preliminary Report on Patentability mailed Aug. 3, 2016 from PCT Patent Application No. PCT/US2015/027188, 8 pages.
Communication pursuant to Rules 161(1) and 162 EPC mailed Dec. 6, 2016 from European Patent Application No. 15721449.5, 2 pages.
Response filed Jan. 9, 2017 to the Communication pursuant to Rules 161(1) and 162 EPC mailed Dec. 6, 2016 from European Patent Application No. 15721449.5, 16 pages.
Demand under Article 31/Response filed Nov. 2, 2015 to International Search Report and Written Opinion mailed Jul. 24, 2014 from PCT Patent Application No. PCT/US2015/027188, 16 pages.
Amendment filed Apr. 12, 2017 from Chinese Patent Application No. 201580023604.0, 13 pages.

* cited by examiner

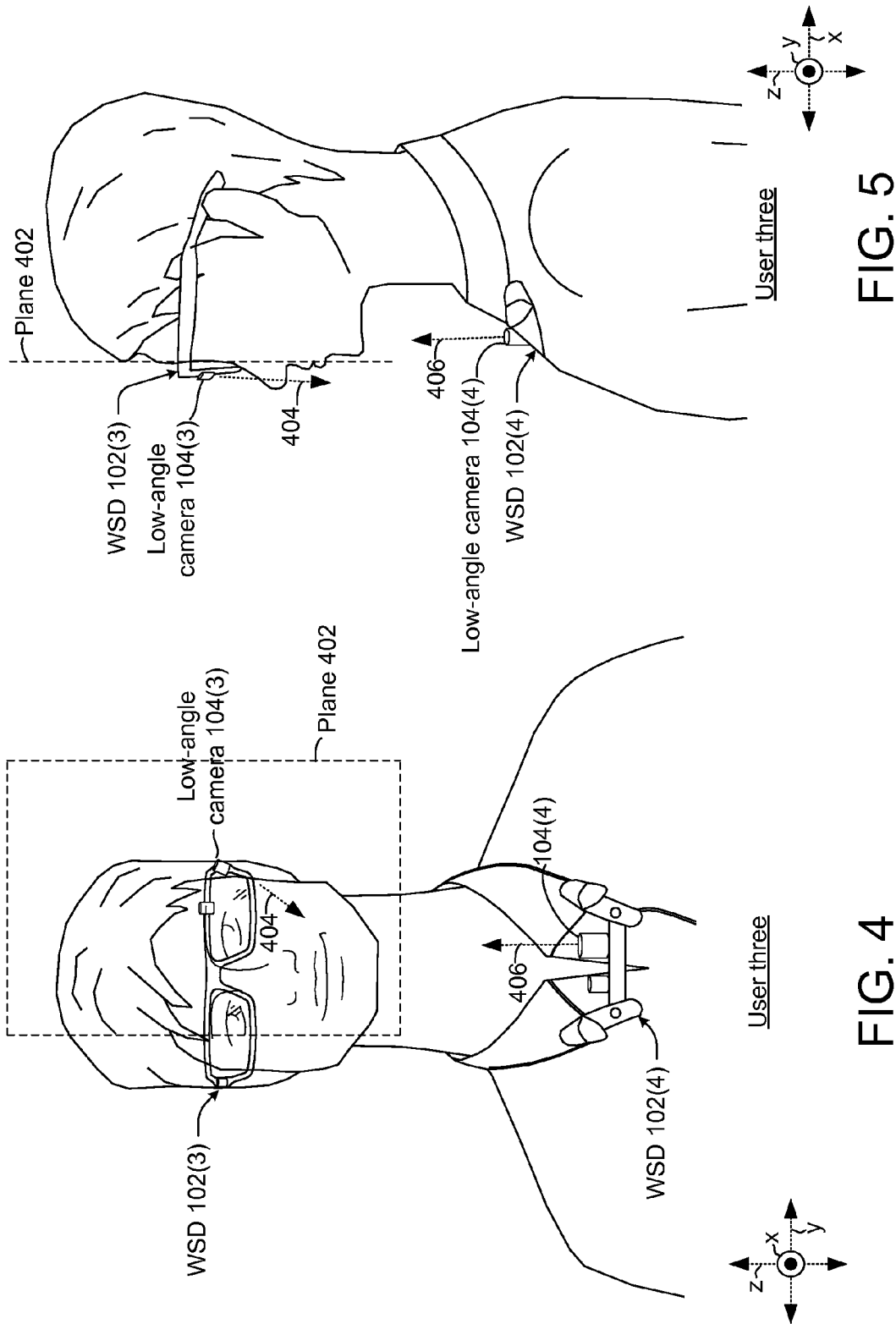

FACIAL EXPRESSION TRACKING

BACKGROUND

Various wearable devices are on the market for particular purposes. For instance, smart glasses and head-mounted displays can determine what a user is looking at. However, these devices do not provide a useful view of the user since the device is positioned against the user and has outward pointing cameras and/or cameras pointed at the user's eyes for eye tracking. The present concepts can offer additional functionality on a wearable device by providing useful views of the user even when the cameras are positioned very close to the user.

SUMMARY

The description relates to facial tracking. One example can include an orientation structure configured to position the wearable device relative to a user's face. The example can also include a camera secured by the orientation structure parallel to or at a low angle to the user's face to capture images across the user's face. The example can further include a processor configured to receive the images and to map the images to parameters associated with an avatar model.

The above listed example is intended to provide a quick reference to aid the reader and is not intended to define the scope of the concepts described herein.

BRIEF DESCRIPTION OF THE DRAWINGS

The accompanying drawings illustrate implementations of the concepts conveyed in the present document. Features of the illustrated implementations can be more readily understood by reference to the following description taken in conjunction with the accompanying drawings. Like reference numbers in the various drawings are used wherever feasible to indicate like elements. Further, the left-most numeral of each reference number conveys the FIG. and associated discussion where the reference number is first introduced.

FIGS. 1 and 4-5 show examples of wearable smart devices in accordance with some implementations of the present concepts.

OVERVIEW

The description relates to capturing useful visual information about a user, such as facial information from cameras positioned very close to and/or at very low angles to the user. The concepts can be implemented on various wearable smart devices that employ low-angle cameras.

One aspect of the present concepts includes the ability to derive valuable information from low angle images of the user. For instance, a camera or cameras may be positioned proximate to the user and capture images that are nearly parallel to the user's face. Normally such images would have little value. The present implementations can derive useful information from these images. The useful information can be used for various purposes, such as to control an avatar of the user in a lifelike manner.

Figure 1:
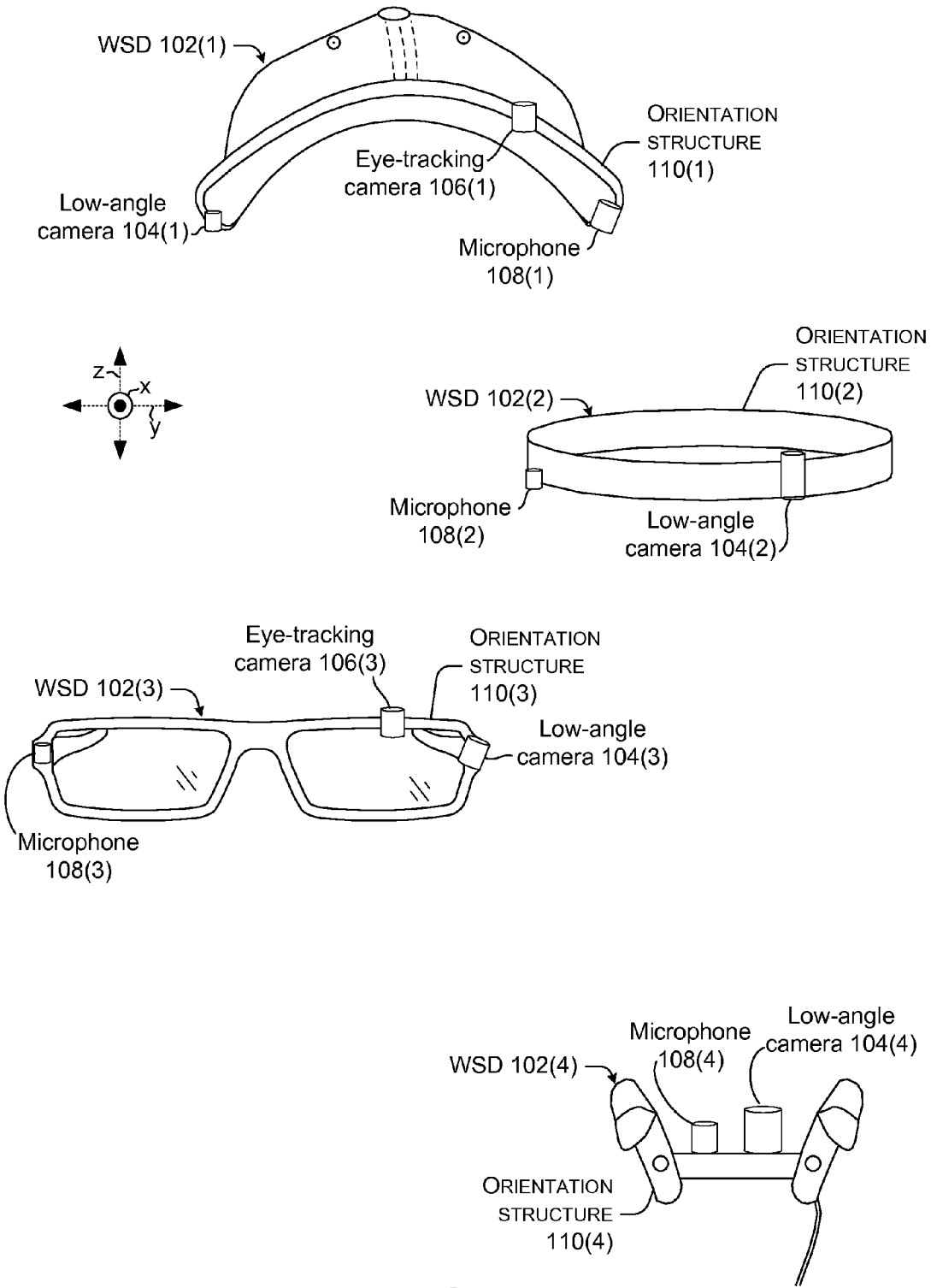

Introductory FIG. 1 shows examples of several wearable smart devices 102. In this case wearable smart device 102(1) is manifest as a smart hat, wearable smart device 102(2) is manifest as a smart head band, wearable smart device 102(3) is manifest as smart eyeglasses, and wearable smart device 102(4) is manifest as a smart microphone. Of course, other examples are contemplated. The wearable smart devices 102 can include one or more sensors. In this example, the sensors are manifest as a low-angle camera 104, an eye-tracking camera 106, and/or a microphone 108. (Note that wearable smart devices 102(1) and 102(3) include both a low-angle camera and an eye-tracking camera. In contrast, wearable smart devices 102(2) and 102(4) do not include an eye-tracking camera). The cameras can be visible light cameras and/or infrared cameras, and/or depth cameras, among others. The functionalities of these elements are explained below. The wearable smart devices can also include an orientation structure 110. The orientation structure can be manifest as a frame, band, bill, or other structure that helps to maintain the position and/or orientation of the sensors relative to the user. As mentioned above, some of the illustrated implementations utilize both a low-angle camera 104 and an eye-tracking camera 106. Other implementations can employ a single camera that can capture data that would otherwise be supplied by the two cameras. For instance, a low-angle camera 104 with a fish eye lens can be utilized to capture portions of the user's face, such as the eye, mouth, cheek, and/or jaw.

To summarize, wearable smart devices are becoming more common. Wearable smart devices often include cameras. However, because the cameras are so close to the user and/or are positioned at unusual orientations, the cameras cannot provide useful images of the user, especially the user's face. The present implementations can position these cameras and process their images in a manner that produces useful information about the user's facial expression, mouth movements, eye blinks, eye gaze direction, etc.

Figure 2:
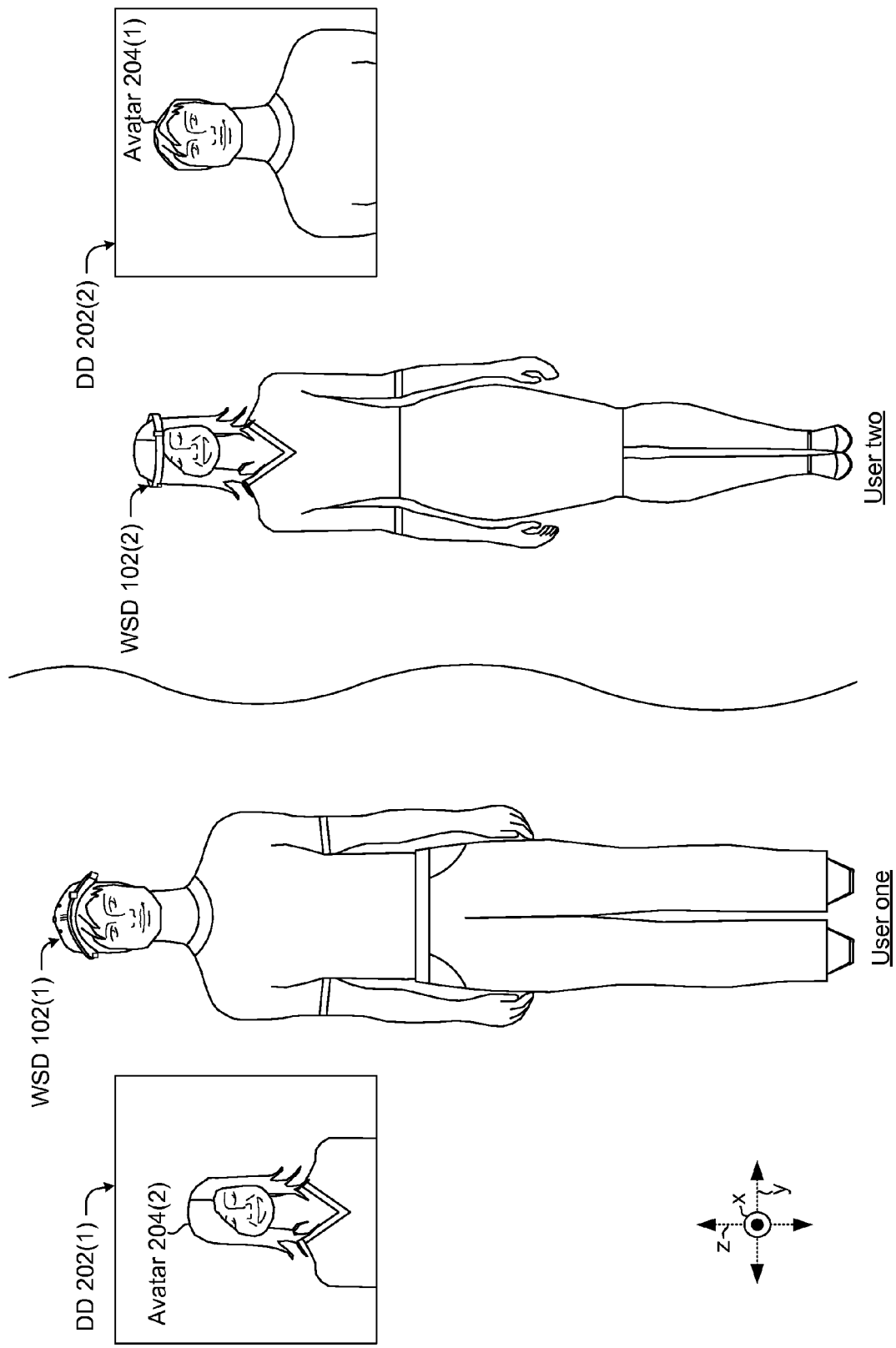
FIGS. 2-3 show examples of visualization scenarios in accordance with some implementations of the present concepts.

FIG. 2 shows a use-case scenario that involves a 'user one' wearing wearable smart device 102(1) and a 'user two' wearing wearable smart device 102(2) and two display devices 202(1) and 202(2). Assume that user one is at a first location proximate to display device 202(1) and user two is at a second location separated from the first location by some distance and that user two is proximate display device 202(2). In this example, (as shown in FIG. 1), wearable smart device 102(1) includes low-angle camera 104(1) and another camera (e.g., eye-tracking camera) 106(1) pointed at user one's eye. Wearable smart device 102(2) includes low-angle camera 104(2).

In this scenario, wearable smart device 102(1) can capture images of user one. These images can be utilized to control a representation of user one. In this case, the representation of user one is manifest as an avatar 204(1) of user one that is presented on display device 202(2) that is proximate to user two. Similarly, wearable smart device 102(2) can capture images of user two. These images can be utilized to control a representation of user two. In this case, the representation of user two is manifest as an avatar 204(2) of user two that is presented on display device 202(1) that is proximate to user one. In this scenario, the users can communicate with one another, and their respective avatars can reflect their eye movements, facial expressions, jaw movements, and/or mouth movements (such as caused by enunciation) to the other user.

The avatars 204 can be manifest in any form, such as a cartoon character or a computer generated character that captures the eye movements, facial expressions, and/or mouth movements but does not necessarily resemble the user. In other implementations, the avatar may be a realistic representation (e.g. augmented photo-realistic image) of the user. The ability to see the respective avatars during the discussion can facilitate a more robust and enjoyable discussion than a voice only communication. For instance, the ability to see the other user's reaction during the discussion can provide feedback that mimics face-to-face conversation.

Note also that while only two users are involved in the scenarios of FIG. 2, other implementations can involve additional users. Further, because the low-angle camera 104 and/or the eye-tracking camera 106 can track the users' eyes, the implementations can distinguish which user individual users are looking at (e.g., user one and user two are looking at the avatar of user three). This information can be reflected in the user's avatar and can be a useful part of the communication process just as in face-to-face group scenarios.

Figure 3:
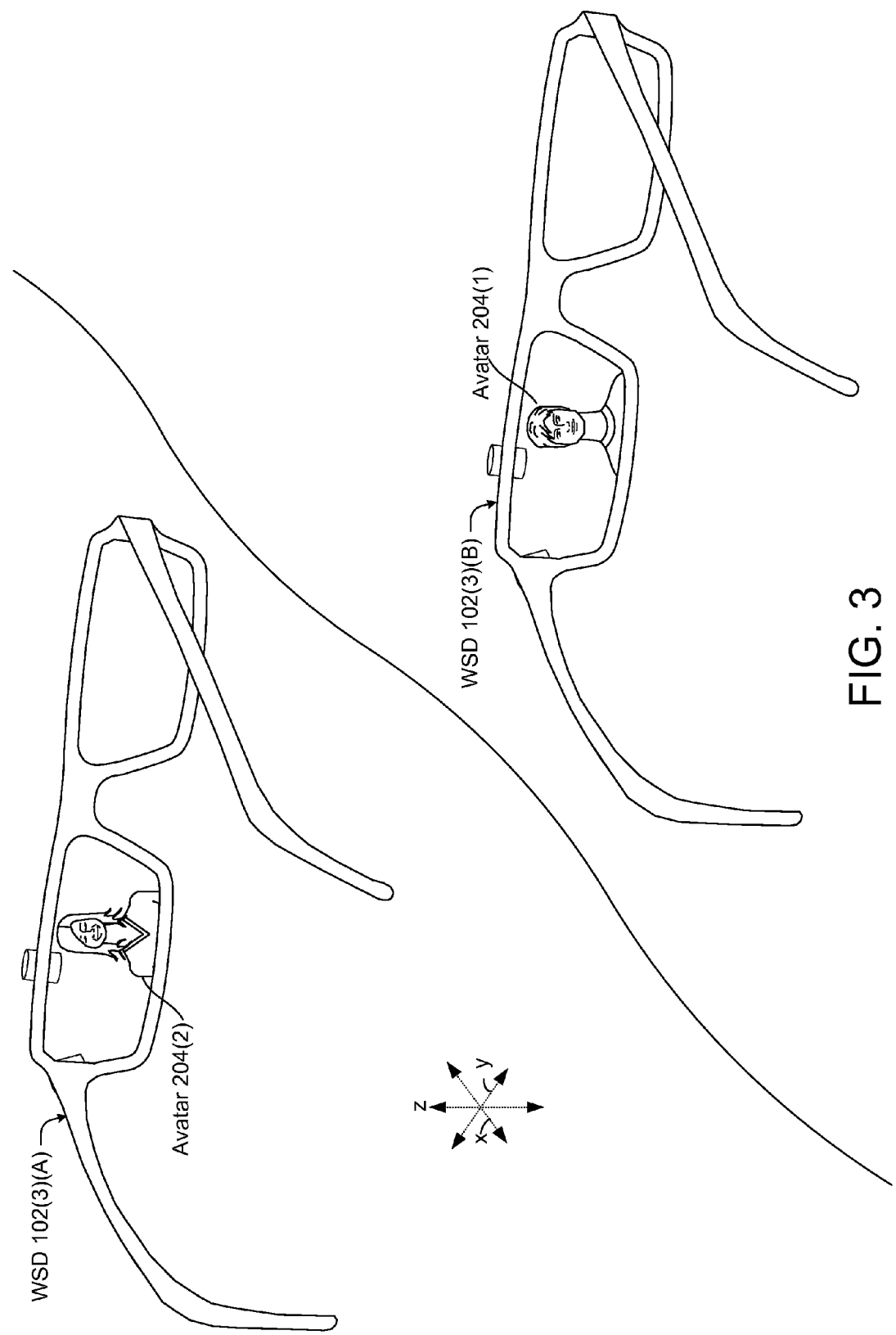

FIG. 3 shows another use case scenario that is similar to the use case scenario of FIG. 2. This particular use case scenario involves two sets of wearable smart devices 102(3)(A) and 102(3)(B). Though not expressly shown, assume that the wearable smart devices are worn by user one and user two of FIG. 2. Similar to the discussion above relative to FIG. 2, wearable smart device 102(3)(A) can capture low-angle images of user one and use the image data to control a representation (e.g., avatar 204(1)) of user one that can be displayed for user two. Similarly, wearable smart device 102(3)(B) can perform the same function relative to user two to control a representation (e.g., avatar 204(2)) of user two that can be displayed for user one.

Thus, wearable smart device 102(3)(A) shows that user one sees user two's avatar 204(2) when looking through the wearable smart device 102(3)(A) and wearable smart device 102(3)(B) shows that user two sees user one's avatar 204(1) when looking through wearable smart device 102(3)(B). In summary, wearable smart devices 102(3)(A) and 102(3)(B) are illustrated from the perspective of user one and user two though the user's themselves are not shown. The wearable smart devices 102(3)(A) and 102(3)(B) can capture image information about the wearer that is used to control the wearer's (e.g., user's) avatar. The avatar is shown by the other user's wearable smart device which simultaneously captures image data for controlling that user's avatar. Stated another way, the avatar 204(2) of user two is displayed for user one by wearable smart device 102(3)(A). Similarly, the avatar 204(1) of user one is displayed for user two by wearable smart device 102(3)(B). Thus, this implementation can provide a standalone wearable smart device that facilitates video calling and/or other uses.

FIGS. 4 and 5 show a front view and a side view, respectively of user three. In this case, 'user three' is wearing wearable smart device 102(3) (e.g., smart eyeglasses) and wearable smart device 102(4) (e.g., smart clip-on microphone). In this case, user three is wearing two wearable smart devices for purposes of explanation. Alternatively, the user could use either of these wearable smart devices without the other. FIGS. 4-5 also show a reference plane 402 that can help to illustrate an example of what is meant by the term "low-angle camera" in the present discussion. In this implementation, the reference plane 402 passes through or includes the front of the user's eyes and the user's mouth.

In this example, the low-angle cameras 104 can be oriented at an angle of less than about +/−45 degrees relative to the reference plane 402 (e.g., the low-angle cameras can capture images generally parallel to a surface of the user's face). In contrast, traditional cameras such as those employed on a smart phone, tablet, or video conferencing system are configured to be oriented generally perpendicularly to the reference plane 402 and cannot capture meaningful image information from low angles.

In this example, the low-angle camera 104(3) of wearable smart device 102(3) is positioned generally in or proximate to the reference plane 402 and is configured to capture images represented by arrows 404 in a direction along or parallel to the reference plane. Similarly, the low-angle camera 104(4) of wearable smart device 102(4) is positioned generally in or proximate to the reference plane 402 and is configured to capture images represented by arrows 406 in a direction along or parallel to the reference plane 402.

Figure 6:
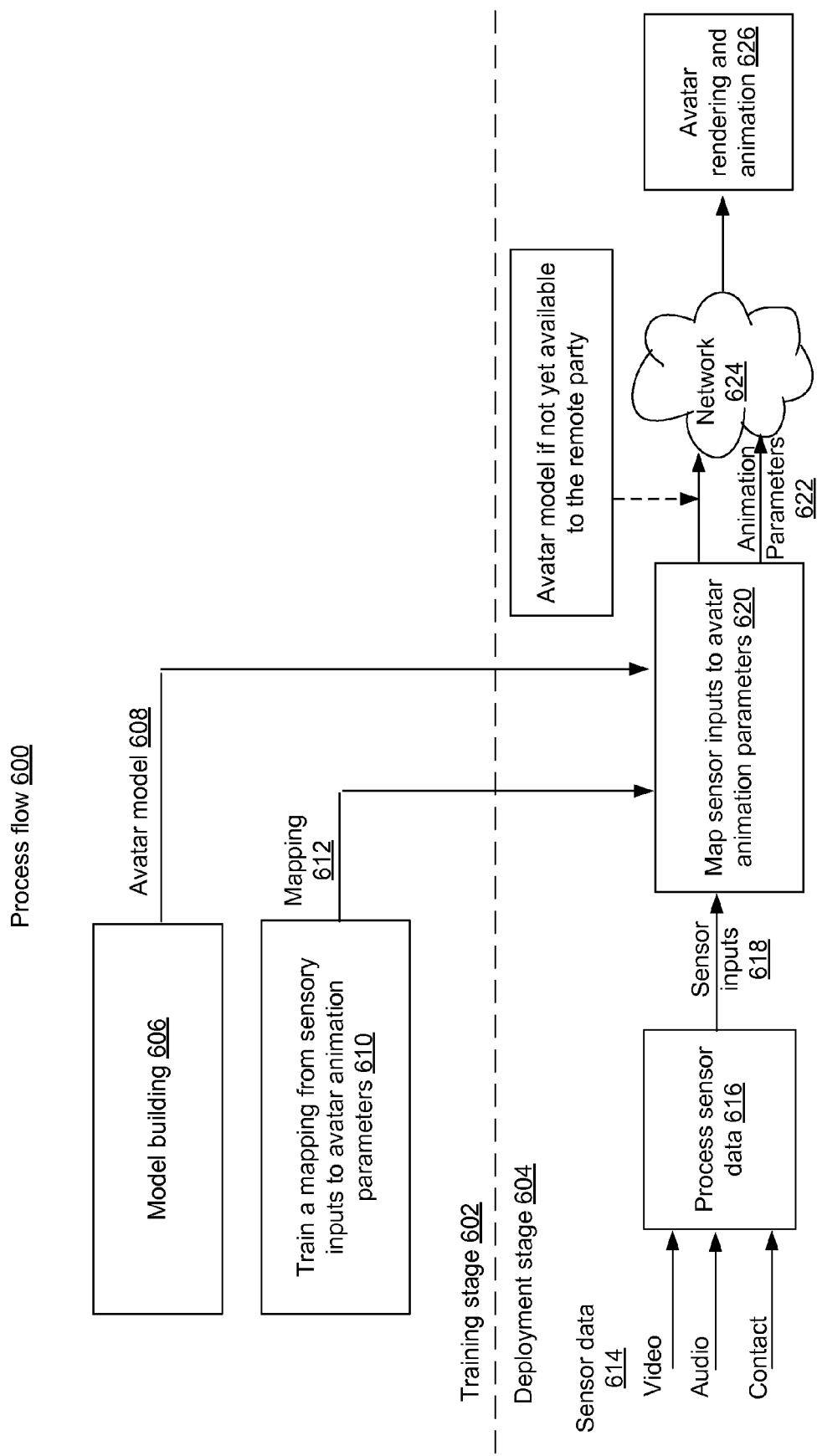
FIG. 6 is an example visualization process in accordance with some implementations of the present concepts.

FIG. 6 shows an example process flow 600 for accomplishing the present concepts. For purposes of explanation, process flow 600 can be divided into a training stage 602 and a deployment stage 604. The training stage can build an avatar model for the user at 606. As mentioned above, the avatar may be photo-realistic or some other form. The user's avatar can be defined via an avatar model 608. The avatar model can include a number of facial parameters or animation parameters, such as corresponding to eye gaze, mouth movements, etc. Further, the process can train for correlation between sensory inputs and the avatar animation parameters at 610 to create a mapping 612. This part of the process flow can be accomplished by simultaneously recording the user with the wearable smart device (e.g., with sensors on the wearable smart device) and an another imaging device such as a red, blue, green plus depth (RGBD) camera. The RGBD camera can be at a normal (generally perpendicular to plane 402 of FIG. 4) orientation. User actions can be captured by the wearable smart device, such as the low-angle camera, microphone, and/or other sensors (See FIG. 1) and by the RGBD camera. The mapping 612 can relate specific user actions of the user as captured by the RGBD camera and the wearable smart device to specific avatar animation parameters.

The deployment stage 604 can be achieved solely with the wearable smart device. In this case various types of sensor data 614 can be gathered by the wearable smart device. In this example, the sensor data 614 can include video data, audio data, and/or contact data, among others, depending upon the sensor configuration of the wearable smart device. (Contact data can be gathered by a sensor in contact with the user's skin that senses skin movement, muscle contraction, etc.) The sensor data 614 can be processed at 616 to derive sensor inputs 618. The sensor inputs 618 can be mapped to the avatar animation parameters at 620 utilizing the avatar model 608 and the mapping 612 from the training stage 602. This aspect outputs avatar animation parameters 622 for deployment stage 604. The avatar animation parameters 620 (and the avatar model 608) can be sent over a network 624 for remote avatar rendering and animation at 626. Specific aspects of process flow 600 are described in more detail below relative to FIGS. 7-12.

In summary, the present concepts can entail a system for facial expression tracking based on body-mounted, inward looking (e.g., eye-tracking) and/or low-angle cameras. Images from these cameras can be leveraged so that the user can be represented with animated avatars at a remote party.

Figure 7:
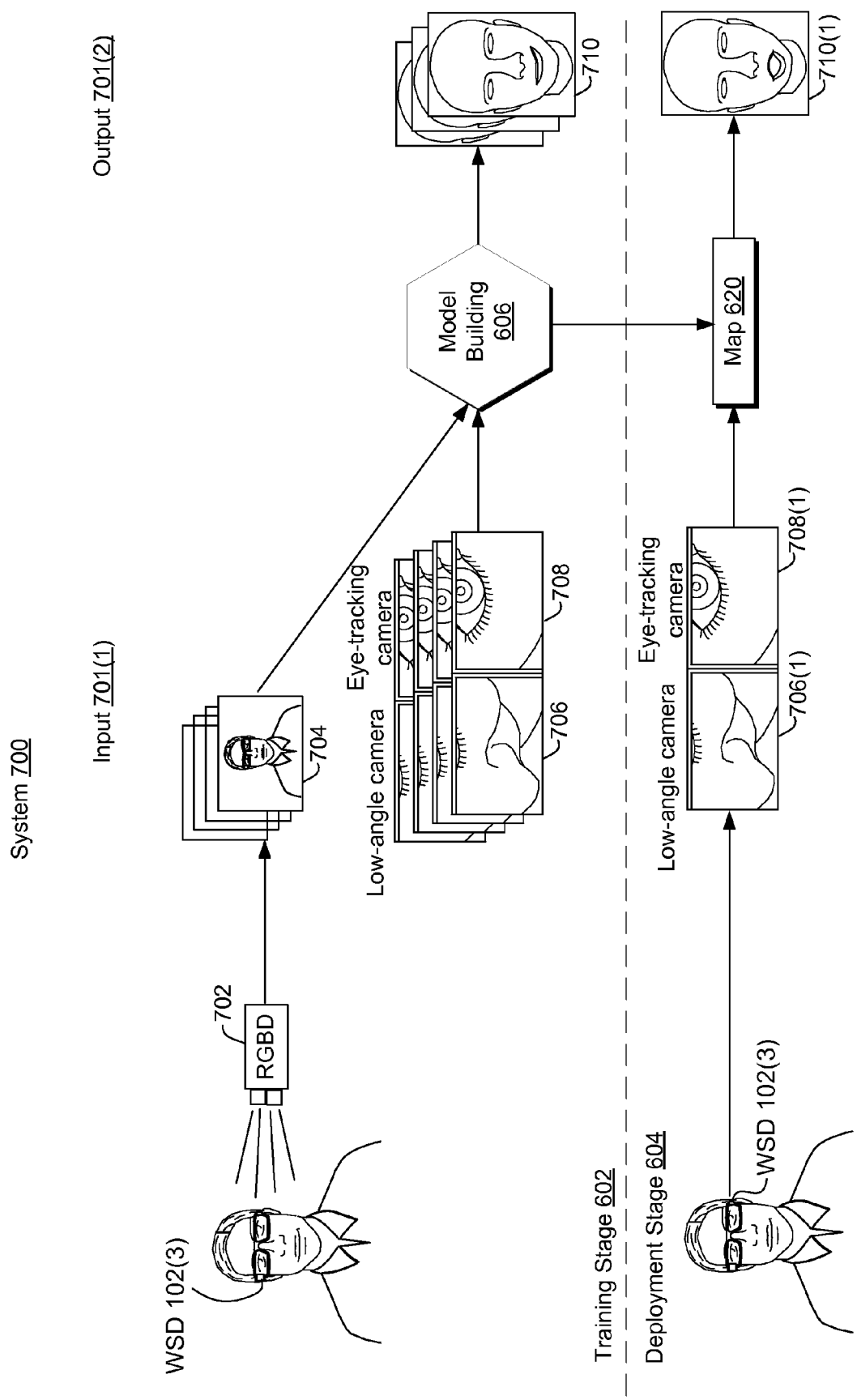
FIGS. 7-11B show aspects of example visualization systems in more detail in accordance with some implementations of the present concepts.

FIG. 7 shows an example system 700 that can provide full facial expression tracking from wearable smart device 102

(3). (FIG. 7 is somewhat redundant to FIG. 6, but has a different emphasis that helps to explain the concepts introduced relative to FIG. 6). For purposes of explanation, system 700 is divided into an input column 701(1) and an output column 701(2).

In this case, system 700 includes a reference camera, such as a visible light camera (e.g., black and white or red, green, blue (RGB)) or a red, green, blue+depth (RGBD) camera 702. One example of such a depth camera is the Kinect® Brand depth camera offered by Microsoft® Corp. The RGBD camera 702 can be oriented toward the user in a normal fashion (e.g., generally pointed at the user perpendicular to the reference plane described above relative to FIGS. 4-5). (Note that in the illustration of FIG. 7, the user is facing forward and the RGBD camera 702 is to the user's side. The RGBD camera would actually be in front of the user (e.g., positioned to capture full face images of the user).

During training stage 602, the RGBD camera 702 can capture full face images 704. Similarly, the wearable smart device's low-angle camera 104(3) and eye-tracking camera 106(3) capture images 706 and 708, respectively of the user simultaneously to the RGBD camera 702. Note that due to the scale of the drawing these elements are not readily distinguishable in FIG. 7 but are readily apparent in FIGS. 1, 4, and 5. Due to the limited field of view of low-angle camera 104(3) and eye-tracking camera 106(3) only part of the user's face is seen in each camera 104(3) and 106(3). Specifically, the low-angle camera 104(3) is directed down the cheek toward the mouth and chin as indicated in images 706, while eye-tracking camera 106(3) is directed toward the user's eye as indicated by images 708. (Note that the illustrated images are representative for purposes of explanation and are not intended to be limiting). Further, the type of lens employed on the low-angle camera can affect the images as well as the angle of orientation to the user. For instance, fish eye lenses can capture more of the user's face in a given orientation than a standard lens. In such an implementation, a single low-angle camera 104(3) can be utilized that captures the eye and the mouth in images 706 and does not utilize two set of images (e.g., does not utilize images 708 or the camera that captures them).

In still another implementation, other sensor data can augment the image data from the low angle camera 104(3). For instance, recall that FIG. 6 indicated various other forms of sensor data 614 beyond images (e.g., video), such as audio data and/or user contact data can be utilized. In such a case, the low-angle camera 104(3) may be the only camera on the smart wearable device. The low-angle camera 104(3) may capture the user's eye and cheek, but not the mouth, for example. In such a case, audio data from the microphone (see microphone 108, of FIG. 1) can capture audio data that can be used in model building 606. For instance, individual sounds uttered by the user can be mapped to individual avatar parameter values relating to mouth movements and/or facial expression during the training stage 602. Thus, audio data can be utilized for some of the avatar parameters and the image data from the low-angle camera 104(3) can be used for other avatar parameters.

In the illustrated configuration, during the training stage 602, the partial-face image streams from the two cameras 104(3) and 106(3) of the wearable smart device 102(3) can be used to estimate the user's full facial expression when evaluated in light of the full face images 704. The estimation can include information about multiple facial expression parameters. The multiple facial expression parameters can be used to drive the user's animated avatar 710. For instance, some implementations can employ a depth-based facial expression tracking algorithm to automatically collect training data for the user. A number of machine learning algorithms can then be employed to build models in order to estimate the facial expression parameters from the training data. Among many possible techniques, ridge regression, multitask feature learning, and/or convolutional neural networks, among others, can be employed.

Stated another way, during the training stage 602 a set of training images (e.g., videos) captured by the wearable smart device 102(3) and corresponding ground truth facial expressions (e.g., images 704) from the RGBD camera 702 can be used to build the avatar model (608 of FIG. 6) that describes their relationship. Note that while the ground truth images are obtained with an RGBD camera in this implementation, other implementations can use other types of sensors or cameras. For instance, ground truth images could be obtained with a standard RGB camera, an infrared camera, and/or other type of sensor. In the deployment stage 604, the model can be used to map input images 706(1) and 708(1) (e.g., video pair streams) from the wearable smart device to the set of facial expression parameters, which can be used to drive avatar 710(1) at the remote party. Specific aspects that are introduced above relative to FIGS. 6-7 are described in more detail below.

Data Acquisition

Recall from FIGS. 4-5 that in this implementation, the cameras of the wearable smart device 102(3) are positioned asymmetrically (e.g., the low-angle camera 104(3) is pointed parallel to the face toward the mouth and the eye-tracking camera 106(3) is pointed at the user's eye). One motivation for the asymmetry is that only one camera is employed to capture redundant facial parts (e.g. gaze can be mostly described by the position of one eye), but parts of the face that can be asymmetric, such as the cheeks, are captured by both cameras. Of course, other configurations, such as three or more cameras in symmetrical and/or asymmetrical configurations are contemplated.

Returning to FIG. 7, various approaches can be utilized to track facial expressions from the RGBD camera inputs (e.g., images 704). For instance, RGBD tracking algorithms, such as Microsoft's Kinect® avatar tracking algorithms can be utilized among others. Some RGBD tracking algorithm implementations can operate on an assumption involving a set of personalized mesh models $B=\{B_0, \ldots, B_n\}$, where $B_0$ is the rest pose and $B_i$, $i>0$ are additive displacements which represent the difference between the rest pose and certain facial expressions. An arbitrary facial expression can thus be generated as:

$$M_j = B_0 + \Sigma_{i=1}^n y_{ij} B_i, \qquad (1)$$

where $y_{ij}$ are the blending weights for pose $M_j$.

The RGBD tracking algorithms can use a number of blend shapes, such as 48 blend shapes, thus for each frame captured, it will generate 48 blending weights. Therefore, the task of estimating the facial expression can be re-cast into the problem of learning 48 regression functions, each of them mapping the information received from the wearable smart device images to the corresponding blend shape weights.

The discussion that follows relates to facial expression tracking, beginning with image preprocessing.

Some implementations can perform preprocessing for the input image data to increase the algorithm's robustness to users wearing different clothes, small movement when taking on and off the wearable smart device, and difference between users.

The first type of preprocessing can relate to skin filtering. This process can be based on three steps. First, a simple classifier can be used to estimate the probability of each pixel being skin. Using only pixel classification may not be robust enough as some false positive pixels may be spotted, particularly so when extremities appear in the background. In order to make the process more robust, some implementations can detect the edges of the image and among the edges find the (potentially) optimal one that separates skin and background regions.

To do so, these implementations can first apply a Canny edge (or other) detector over the whole image. The sensibility of the detector can be set to be high so that a set of many edges are detected so that any useful edges are included in the set. Finally, these implementations can find the (potentially) optimal edge by using a dynamic programming algorithm which makes use of the information collected in the previous two processes. This method can iterate over the columns of the image, from left to right, for example. Relative to each column, the process can compute for each pixel belonging to an edge, the probability of it being part of the (potentially) optimal edge. This can be computed based on skin probabilities of the pixels above and below it, as well as the likelihood of the left neighboring pixels, which was computed in the previous iteration.

Figure 8:
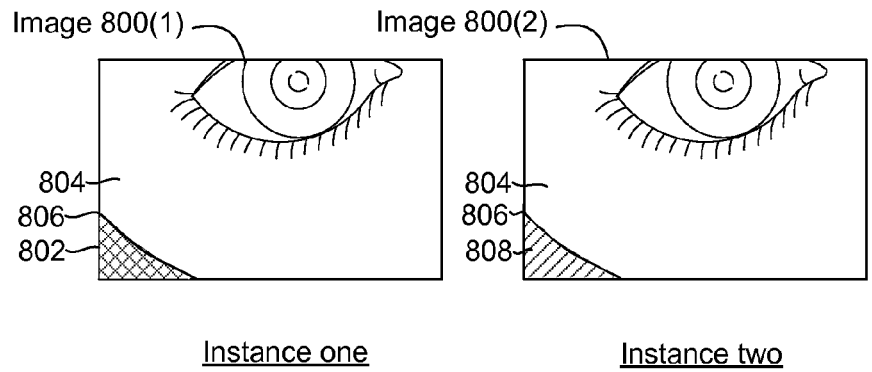

FIG. 8 shows one such example. Instance one shows an image 800(1) from the inward looking eye-tracking camera 106(3) (FIGS. 4-5) before processing. This explanation has to do with color which is difficult to illustrate in line drawings. In Instance one, an area 802 shown in cross-hatching is background that is of a similar color to the adjacent skin 804 and as such can be difficult to distinguish. A border 806 can be detected and in Instance two the color of the background region is changed to a contrasting color (in this case white represented by diagonal lines) as indicated at 808 in a processed image 800(2).

Figure 9:
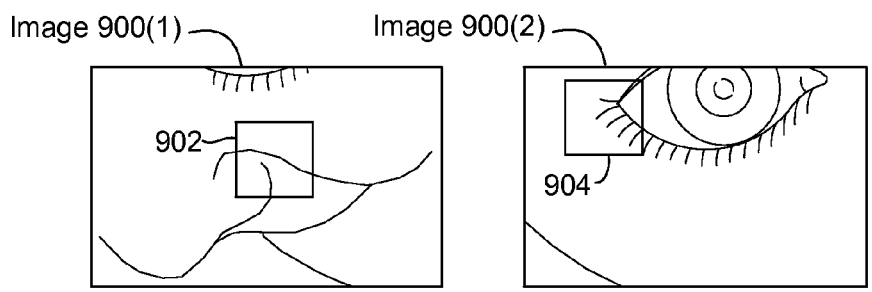

FIG. 9 shows an example of the second type of preprocessing employed by some implementations. This second type of preprocessing can handle small camera movement or difference between different users. In such cases, a registration method can be employed that aligns all images (in this case left image 900(1) and right image 900(2)) based on template matching. A nose-cheek wrinkle 902 and the outer right eye corner 904 are searched in the left and right camera images 900(1) and 900(2) respectively, and the input images are adjusted accordingly to reduce registration error between images. As shown in the experimental results, this registration step can be very helpful for training new users.

After the preprocessing, two forms of the input image can be utilized: raw pixels and local binary pattern (LBP) descriptions.

For purposes of explanation, denote the training input data by a matrix $X \in \mathbb{R}^{d \times N}$, which contains N training instances that have dimensionality d, and $Y \in \mathbb{R}^{N \times 48}$ the training labels (blend shape weights obtained from the RGBD tracking algorithm). $y_t$ can be used to denote the t-th column of Y, that is, the ground truth weights for the t-th blend shape. Given that the machine learning problem can consist in a multi-output regression, three machine learning algorithms (ridge regression, multi-task feature learning, and convolutional neural networks) have been employed. Of course, other machine learning algorithms can be employed in other implementations.

Ridge Regression

Ridge Regression (RR) can learn a linear model for each of the outputs by solving the following optimization problem:

$$\operatorname*{argmin}_{w} \|X^T W - Y\|_{Fro}^2 + \lambda \|W\|_{Tr}, \quad (4)$$

where $w_t$ is the d-dimensional weight vector for blend shape t. Note the above problem is independently solved for every blend shape.

Multi-Task Feature Learning

Figure 10:
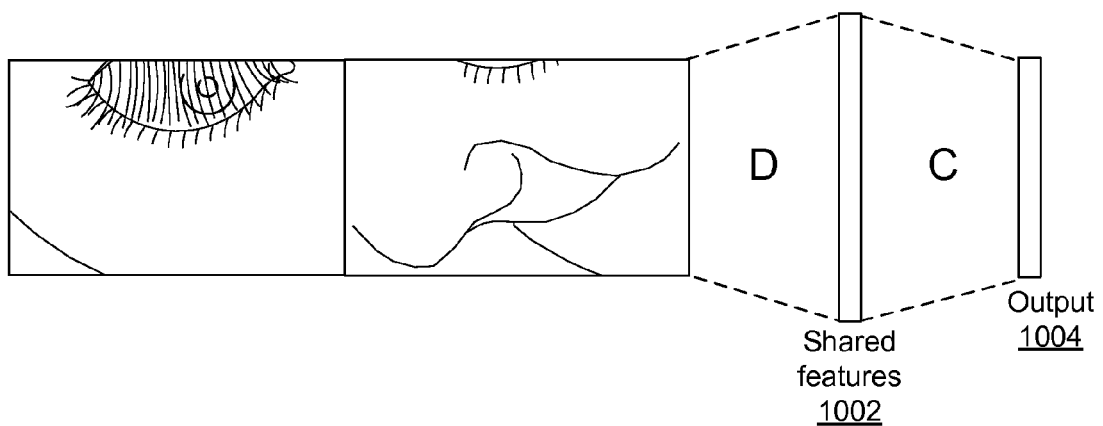

Considering that the blend shape weights are together to describe the facial expression, and these blend shapes are nonorthogonal, they can be expected to be linearly correlated. As a result, multi-task feature learning (MTFL) can be employed for the present task. MTFL can try to exploit the commonalities between blend shape weights by learning all tasks simultaneously. MTFL can attempt to solve the following optimization problem:

$$\operatorname*{argmin}_{C,D} \|X^T DC - Y\|_{Fro}^2 + \frac{\lambda}{2}(\|C\|_{Fro}^2 + \|D\|_{Fro}^2), \quad (3)$$

where $\|\cdot\|_{Fro}^2$ denotes the square of the Frobenius norm of a matrix, i.e., the sum of the square of its elements. As shown in FIG. 10, there can be a common layer to all tasks formed by multiplying the input with matrix D, which represents shared features 1002. Output layer 1004 is then formed by multiplying the shared features with matrix C. Both layers are linear.

The problem in Eq. (3) is non-convex. Instead the process can optimize its equivalent convex problem given by:

$$\operatorname*{argmin}_{w_t} \|X^T w_t - y_t\|_2^2 + \lambda \|w_t\|_2^2, \quad (2)$$

where W=DC; and $\|\cdot\|_{Tr}$ denotes the trace norm of a matrix, namely the sum of its singular values.

Neural Networks

Figure 11A:
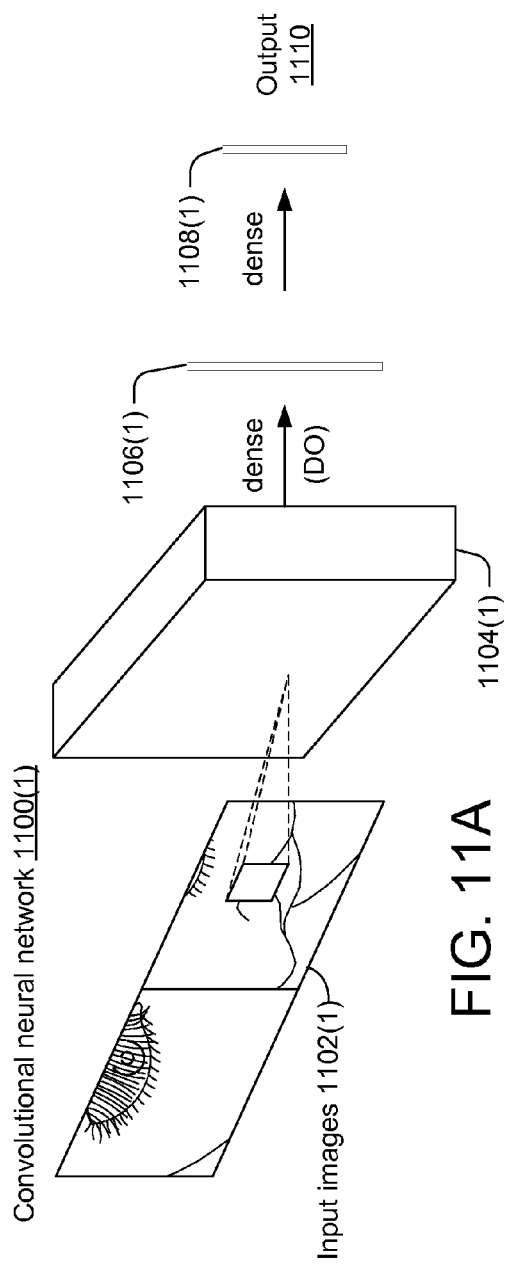
Figure 11B:
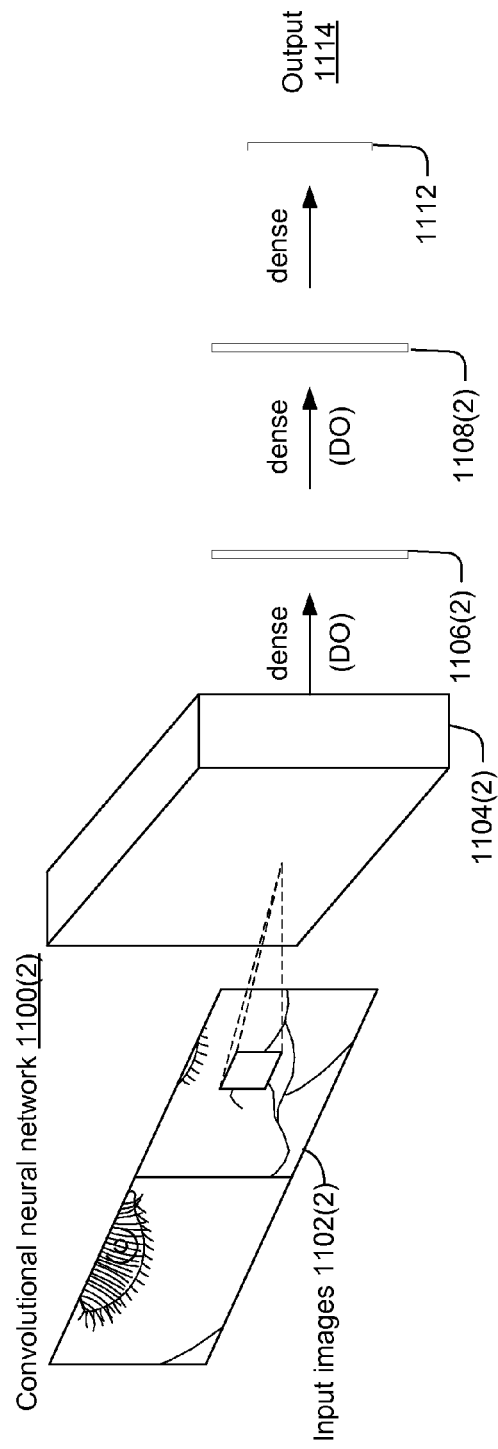

FIGS. 11A and 11B show two convolutional neural networks 1100(1) and 1100(2). The first convolutional neural network 1100(1) receives input images 1102(1) at a convolutional layer 1104(1). In this example the convolutional layer 1104(1) has 16 kernels of size 3×3. The convolution layer's output is dropout (DO) enabled and is fully connected to a layer 1106(1) of 50 nodes. The output from the 50 node layer is then sent to an output layer 1108(1) of 48 nodes which produces a final output 1110.

The second convolutional neural network 1100(2) includes a first layer that also is a convolution layer 1104(2) with 16 kernels of size 3×3. The first convolution layer 1104(2) receives input images 1102(2). The output of the first convolution layer is densely connected to second hidden layer 1106(2). In this example the second hidden layer has 200 hidden units. Output of the second hidden layer is directed to third layer 1108(2). In this example, the third layer is a fully connected layer, which also has 200 output nodes. In this instance a final layer 1112 receives the output of the third layer 1108(2) to produce final output 1114. The third layer 1108(2) can be a fully connected layer with 48 outputs. In some implementations, rectified linear unit (ReLU) nonlinearity is used at all convolutional and fully connected layers except the output ones. In addition, dropout is enabled at some of the fully connected layers.

In summary, the above description explains how to perform facial expression tracking from wearable cameras (e.g., cameras of wearable smart devices) that are positioned in unusual orientations, such as nearly parallel to the user's face. Ground truth data can be obtained using a depth camera simultaneously to the cameras of the wearable smart devices. A depth-based facial expression tracking algorithm can be utilized to correlate image information from the two cameras in the ground truth data. The ground truth data can be used to train a regression model associated with facial parameters. Subsequently, images from the wearable smart device can be processed with the regression model to derive the parameters for controlling the user's avatar.

Figure 12:
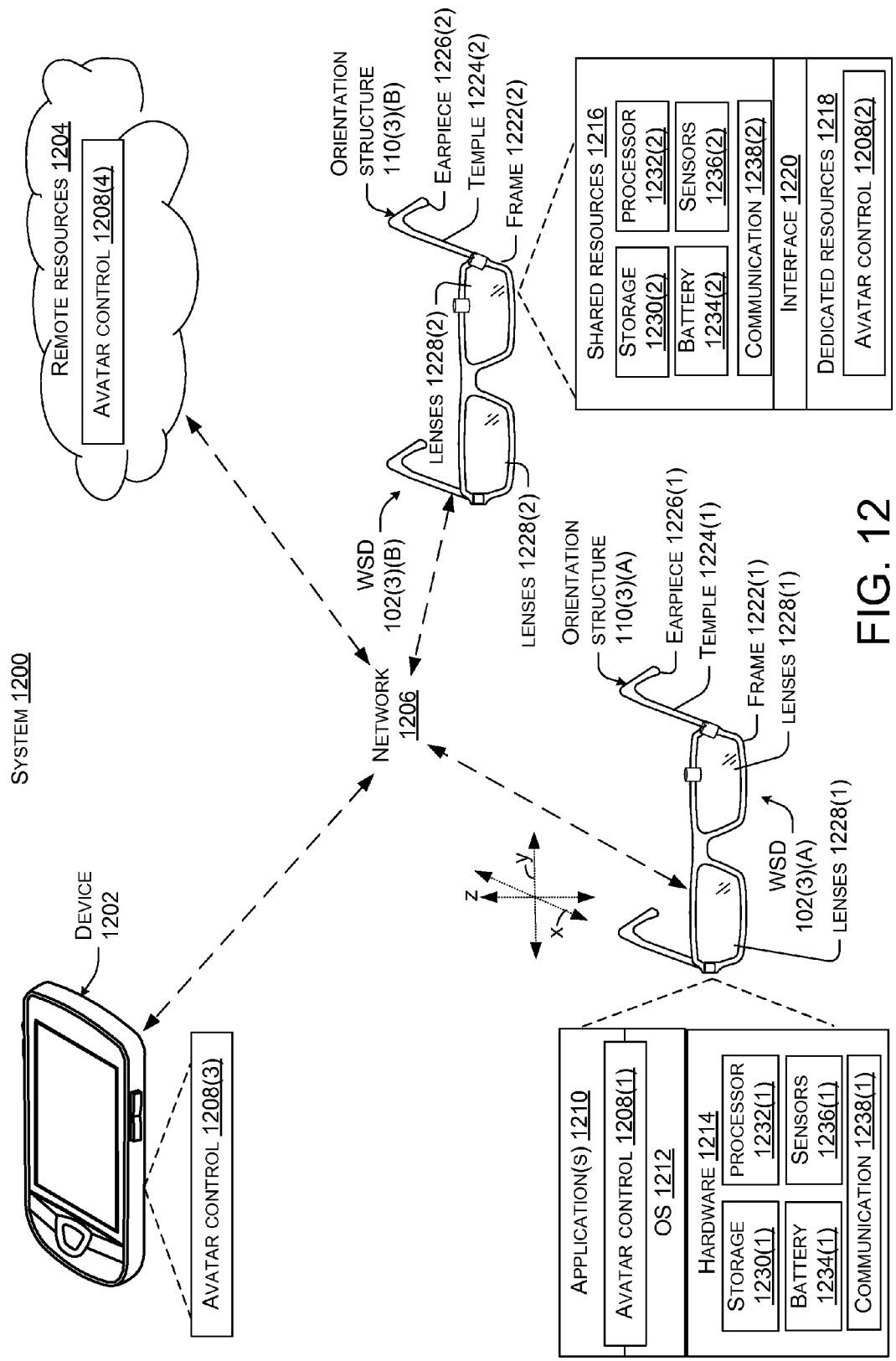
FIG. 12 shows an example visualization system in accordance with some implementations of the present concepts.

FIG. 12 shows a visualization system 1200. For purposes of explanation, system 1200 includes two wearable smart devices 102(3)(A) and 102(3)(B) manifest as smart glasses. These illustrated wearable smart devices represent two device configurations, either of which can be applied to other wearable smart devices beside smart glasses. Briefly, wearable smart device 102(3)(A) represents an operating system centric configuration and wearable smart device 102(3)(B) represents a system on a chip configuration. These aspects will be described in more detail below. System 1200 also includes a device 1202 that is not a wearable smart device. In this case, the device 1202 is manifest as a smart phone, but is intended to be representative of any type of device that the wearable smart devices could communicated with. System 1200 further includes remote resources 1204, such as cloud-based resources, that the wearable smart devices can communicate with via network(s) 1206. Either or both of device 1202 and remote resources 1204 can work in cooperation with a wearable smart device to achieve the present concepts. Any of wearable smart devices 102(3)(A) and 102(3)(B), device 1202, and/or remote resources 1204 can support or include an avatar control component 1208. The avatar control components will be described in more detail below after a discussion of other elements of wearable smart devices 102(3)(A) and 102(3)(B).

For purposes of explanation, wearable smart device 102(3)(A) is organized into an application 1210, an operating system 1212, and hardware 1214. Wearable smart device 102(3)(B) is organized into shared resources 1216, dedicated resources 1218, and an interface 1220 therebetween.

Wearable smart devices 102(3)(A) and 102(3)(B) can further include orientation structure 110 that can include a frame 1222 and that is connected to temples 1224. The temples can extend along a long axis (parallel to the x reference axis) and terminate in earpieces 1226. The frame can support (a pair of) lenses 1228. The wearable smart devices can further include storage 1230, a processor 1232, a battery 1234 (or other power source), sensors 1236 and/or a communication component 1238. The wearable smart devices can alternatively or additionally include other elements, such as input/output devices, buses, graphics cards (e.g., graphics processing units (CPUs)), etc., which are not illustrated or discussed here for the sake of brevity. In one configuration, the battery 1234 can be positioned in one of the earpieces 1226 while the communication component 1238, storage 1230, and processor 1232 are positioned in the other.

In this example the sensors 1236 are manifest as the low-angle camera 104, eye-tracking camera 106, and microphone 108. Note that as used here, a camera can be thought of as any type of sensor that can capture information about features of the user. Cameras can be visible light or other wavelengths. Cameras can employ different types of lenses. For instance, cameras can employ convex lenses, aspherical lenses, and/or fish eye lenses, among others. A fish eye lens may allow a single camera to capture a large portion of the user's face that might otherwise entail the use of two cameras to capture. Additional details about the camera(s) is described above beginning at FIG. 1. Of course, while cameras are described in detail other implementations can alternatively or additionally use other types of sensors 1236.

The eyeglass lenses 1228 can be corrective or non-corrective. In some implementations, the lenses can have the capability of displaying images for the user to view. The displaying can be accomplished by projection or by including light emitting diodes or other components within the lens.

The communication component 1238 can include a receiver and a transmitter and/or other radio frequency circuitry for communicating with various technologies, such as cellular, Wi-Fi (IEEE 802.xx), Bluetooth, etc.

The avatar control component 1208 can receive input from the sensors 1236. The avatar control component 1208 can utilize an avatar model to derive animation parameters from the sensor data to control the user's avatar. The avatar control component 1208 on an individual wearable smart device 102(3) can be relatively robust such that it processes the sensor data to determine values of the animation parameters. For example, wearable smart device 102(3)(A) can determine animation parameter values from sensors 1236 (1). Wearable smart device 102(3)(A) can animate the user/s avatar and send the animation to another device or it can send the animation parameter values to another device for execution.

For instance, relative to wearable smart device 102(3)(A), the avatar control component 1208(1) can send the animation parameter values to the communication component 1238(1) for communication to a remote device, such as wearable smart device 102(3)(B). The avatar control component 1208(2) of the receiving device can control the user's avatar based upon the received animation parameter values. At the same time, the avatar control component 1208(2) of the remote device can be receiving data from sensors 1236(2), processing the sensor data to determine animation parameter values and sending the animation parameter values to wearable smart device 102(3)(A).

In other configurations, wearable smart device 102(3)(A) might be less robust and might send some of the sensor data to device 1202 or remote resources 1204 for processing by avatar control component 1208(3) or 1208(4), respectively. These avatar control components 1208(3) or 1208(4) could determine the animation parameter values on behalf of wearable smart device 102(3)(A) and communicate them to wearable smart device 102(3)(B) on behalf of wearable smart device 102(3)(A).

In still another configuration, wearable smart device 102(3)(A) could send animation parameter values to device 1202. The device 1202 could capture a 'normal' video stream of a user (e.g., in a video call) and send the video stream to wearable smart device 102(3)(A). Thus, a user of wearable smart device 102(3)(A) would see normal video of the user of device 1202 while the user of device 1202 would see an animated avatar of the user of wearable smart device 102(3)(A).

From one perspective, wearable smart devices 102(3)(A) and 102(3)(B), device 1202, and/or remote resources 1204 can be thought of as computers.

The term "device," "computer," or "computing device" as used herein can mean any type of device that has some amount of processing capability and/or storage capability. Processing capability can be provided by one or more processors that can execute data in the form of computer-readable instructions to provide a functionality. Data, such as computer-readable instructions and/or user-related data, can be stored on storage, such as storage that can be internal or external to the computer. The storage can include any one or more of volatile or non-volatile memory, hard drives, flash storage devices, and/or optical storage devices (e.g., CDs, DVDs etc.), remote storage (e.g., cloud-based storage), among others. As used herein, the term "computer-readable media" can include signals. In contrast, the term "computer-readable storage media" excludes signals. Computer-readable storage media includes "computer-readable storage devices." Examples of computer-readable storage devices include volatile storage media, such as RAM, and non-volatile storage media, such as hard drives, optical discs, and flash memory, among others.

Examples of devices can include traditional computing devices, such as personal computers, desktop computers, notebook computers, cell phones, smart phones, personal digital assistants, pad type computers, digital whiteboards, cameras, wearable devices, such as smart glasses, or any of a myriad of ever-evolving or yet to be developed types of computing devices.

As mentioned above, wearable smart devices 102(3)(B) can be thought of as a system on a chip (SOC) type design. In such a case, functionality provided by the device can be integrated on a single SOC or multiple coupled SOCs. One or more processors can be configured to coordinate with shared resources, such as memory, storage, etc., and/or one or more dedicated resources, such as hardware blocks configured to perform certain specific functionality. Thus, the term "processor" as used herein can also refer to central processing units (CPU), graphical processing units (CPUs), controllers, microcontrollers, processor cores, or other types of processing devices.

Generally, any of the functions described herein can be implemented using software, firmware, hardware (e.g., fixed-logic circuitry), manual processing, or a combination of these implementations. The term "component" as used herein generally represents software, firmware, hardware, whole devices or networks, or a combination thereof. In the case of a software implementation, for instance, these may represent program code that performs specified tasks when executed on a processor (e.g., CPU or CPUs). The program code can be stored in one or more computer-readable memory devices, such as computer-readable storage media. The features and techniques of the component are platform-independent, meaning that they may be implemented on a variety of commercial computing platforms having a variety of processing configurations.

Note that in any of the present implementations, the user's privacy can be protected by only enabling visualization features upon the user giving their express consent. All privacy and security procedures can be implemented to safeguard the user. For instance, the user may provide an authorization (and/or define the conditions of the authorization). The wearable smart device only proceeds with facial tracking the user according to the conditions of the authorization. Otherwise, user information is not gathered. Similarly, the user can be allowed to define the use of his/her data that includes visualization data. Any use of the visualization data has to be consistent with the defined user conditions.

CONCLUSION

The present implementations can derive useful information from low-angle camera (and/or other sensors) that only capture a partial view of the user's face. The present implementations can employ machine learning algorithms to estimate facial expression parameters based on training data collected with the assistance of depth sensors, such as Kinect® Brand depth sensor offered by Microsoft® Corp. The present implementations can reliably track people's facial expression even from very limited view angles of the cameras.

The described methods or processes can be performed by the systems and/or devices described above, and/or by other devices and/or systems. The order in which the methods are described is not intended to be construed as a limitation, and any number of the described acts can be combined in any order to implement the method, or an alternate method. Furthermore, the method can be implemented in any suitable hardware, software, firmware, or combination thereof, such that a device can implement the method. In one case, the method is stored on computer-readable storage media as a set of instructions such that execution by a processor of a computing device causes the computing device to perform the method.

Although techniques, methods, devices, systems, etc., pertaining to visualization information are described in language specific to structural features and/or methodological acts, it is to be understood that the subject matter defined in the appended claims is not necessarily limited to the specific features or acts described. Rather, the specific features and acts are disclosed as exemplary forms of implementing the claimed methods, devices, systems, etc.

The invention claimed is:

1. A system comprising:
 smart eyeglasses, comprising:
  a frame securing a pair of lenses positioned for a user wearing the smart eyeglasses to look through; and
  at least one sensor secured relative to the frame and configured to capture low-angle sensor data comprising images of a cheek or jaw of the user wearing the smart eyeglasses, the at least one sensor being oriented at an angle of less than 45 degrees relative to a reference plane that is parallel to the face of the user wearing the smart eyeglasses; and
 a processor configured to:
  obtain the low-angle sensor data;
  use a model to correlate the images of the cheek or jaw from the low-angle sensor data to animation parameters including mouth movements for an avatar representing the user wearing the smart eyeglasses; and
  output the animation parameters.

2. The system of claim 1, the smart eyeglasses further comprising:
 at least one other sensor oriented on the frame toward the eye of the user wearing the smart eyeglasses and configured to capture other images of the user's eye,
 wherein the processor is configured to obtain the animation parameters by using the model to process both the images and the other images.

3. The system of claim 2, wherein the at least one sensor and the at least one other sensor comprise visible light cameras or infrared cameras.

4. The system of claim 1, wherein the at least one sensor includes a fish eye lens that can capture the mouth of the user wearing the smart eyeglasses and at least one of the user's eyes in an individual image.

5. The system of claim 1, wherein the frame includes a pair of temples and wherein the at least one sensor is oriented generally perpendicular to a long axis of an individual temple of the pair of temples.

6. The system of claim 1, further comprising:
a computing device separate from the smart eyeglasses, the processor being embodied in the computing device, wherein the smart eyeglasses further comprise circuitry configured to transmit the low-angle sensor data to the computing device.

7. The system of claim 1, wherein the processor is provided on the smart eyeglasses.

8. The system of claim 1, wherein the images of the cheek or jaw used to determine the mouth movements do not include images of the mouth of the user wearing the smart eyeglasses.

9. A smart device, comprising:
an orientation structure configured to position the smart device relative to a face of a user wearing the smart device;
a parallel or low-angle camera secured by the orientation structure parallel to or at a low angle to the user's face to capture parallel or low-angle image data comprising images of a cheek or jaw of the user wearing the smart device; and
a processor configured to:
obtain the parallel or low-angle image data from the parallel or low-angle camera;
correlate the images of the cheek or jaw from the parallel or low-angle image data to mouth animation parameters representing mouth movements of the user wearing the smart device; and
output the mouth animation parameters.

10. The smart device of claim 9, manifest as smart eyeglasses and wherein the orientation structure comprises a frame.

11. The smart device of claim 10, further comprising a pair of lenses supported by the frame, wherein the parallel or low-angle camera is oriented at an angle of less than 45 degrees relative to a reference plane that is parallel to the face of the user wearing the smart device.

12. The smart device of claim 11, wherein the smart eyeglasses are configured to present an image on one or both of the lenses of the pair of lenses.

13. The smart device of claim 11, wherein the pair of lenses is corrective lenses.

14. The smart device of claim 9, manifest as a smart hat and wherein the orientation structure comprises a bill of the smart hat.

15. The smart device of claim 9, wherein the orientation structure comprises a head band.

16. The smart device of claim 9, wherein the orientation structure comprises a frame and further comprising clips for securing the frame to clothing of the user wearing the smart device.

17. The smart device of claim 9, further comprising another camera secured by the orientation structure and wherein the another camera is pointed toward the eye of the user wearing the smart device.

18. The smart device of claim 17, wherein the processor is further configured to:
control an avatar that represents the user wearing the smart device based at least on the mouth animation parameters.

19. A computer implemented method, comprising:
receiving low-angle image data captured at a low angle along a face of a user that is wearing a wearable device, the low-angle image data including images of a cheek or jaw of the user wearing the wearable device;
processing the images of the cheek or jaw of the user obtaining with a model configured to map the images of the cheek or jaw to mouth animation parameters; and
causing an animated representation of the user to perform mouth movements according to the mouth animation parameters.

20. The method of claim 19, wherein the receiving the low-angle image data comprises receiving the low-angle image data over a network from the wearable device, the wearable device having a sensor that captured the low-angle image data.

21. The method of claim 19, further comprising:
obtaining frontal training images from a reference camera positioned in front of the user;
obtaining low-angle training images from a low angle camera positioned at a low angle relative to the user's face, the low-angle training images capturing the jaw or cheek of the user; and
training the model using the frontal training images and the low-angle training images.

* * * * *